United States Patent
Shinn et al.

(10) Patent No.: US 8,259,254 B2
(45) Date of Patent: Sep. 4, 2012

(54) ELECTRONIC PAPER DEVICE AND MANUFACTURING METHOD THEREOF

(75) Inventors: Ted-Hong Shinn, Hsinchu (TW); Chi-Ming Wu, Tainan (TW); Fang-An Shu, Hsinchu (TW); Yao-Chou Tsai, Taipei (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 13/234,894

(22) Filed: Sep. 16, 2011

(65) Prior Publication Data

US 2012/0032176 A1    Feb. 9, 2012

Related U.S. Application Data

(63) Continuation of application No. 13/006,629, filed on Jan. 14, 2011, now Pat. No. 8,040,460.

(30) Foreign Application Priority Data

Aug. 6, 2010    (TW) .............................. 99126338 A

(51) Int. Cl.
*G02F 1/1335*    (2006.01)

(52) U.S. Cl. ............... 349/62; 349/56; 349/61; 349/69; 349/70

(58) Field of Classification Search ................... 349/56, 349/61, 62, 69, 70
See application file for complete search history.

(56) References Cited

U.S. PATENT DOCUMENTS

| | | | |
|---|---|---|---|
| 6,215,154 B1 * | 4/2001 | Ishida et al. | 257/347 |
| 6,633,081 B2 | 10/2003 | Sahara et al. | |
| 7,230,592 B2 * | 6/2007 | Sato et al. | 345/76 |
| 7,462,511 B2 | 12/2008 | Yamagata | |

* cited by examiner

*Primary Examiner* — Jennifer Doan
(74) *Attorney, Agent, or Firm* — CKC & Partners Co., Ltd.

(57) ABSTRACT

This present invention provides an electronic paper display device. The electronic paper display device includes a thin film transistor array substrate and a display panel disposed on one side of the thin film transistor array substrate. The thin film transistor array substrate comprises a first substrate, a first metal layer, a dielectric layer, a second metal layer, a channel layer, a pixel electrode layer, a protection layer, a first resin layer and a second resin layer. The display panel includes a second substrate, a transparent electrode layer disposed on the second substrate, and an electronic ink material layer between the transparent electrode layer and the thin film transistor array substrate.

14 Claims, 6 Drawing Sheets

ELECTRONIC PAPER DEVICE AND MANUFACTURING METHOD THEREOF

CROSS-REFERENCE TO RELATED APPLICATION

The present application is a continuational of U.S. application Ser. No. 13/006,629, filed on Jan. 14, 2011, which was based on, and claims priority from, Taiwan Patent Application Serial Number 099126338, filed Aug. 6, 2010, the disclosure of which is hereby incorporated by reference herein in its entirely.

BACKGROUND

1. Field of Invention

The present invention relates to an electronic paper device and manufacturing method thereof. More particularly, the present invention relates to an electronic paper device that can prevent hitting damage and a manufacturing method to manufacture this device.

2. Description of Related Art

With the improvement of techniques for manufacture and design, many new display apparatus is developed, wherein the electronic paper display device presents many advantages including lower energy consumption, longer lifetime, and smaller size.

The electronic paper display device was developed in the 1970s. One of the major characteristic of the display device is incorporation of electrically charged micro-spheres with half of it being painted with white color and the other half being painted with black color. When an electric field is adjusted, the sphere will rotate top to bottom and hence display a different color. In the second generation of electronic paper display device developed in the 1990s, mini capsules have replaced the micro-spheres. Colored oil and charged white particles fill the mini capsules. The white particles can move to the top or sink to the bottom under a controlled electric field. When the white particles rise to the top (move closer to the reader), a white color is displayed. On the other hand, when the white particles sink to the bottom (away from the reader), the color of the oil is displayed.

However, the display panel substrate is adhered to the thin film transistor (TFT) array substrate. That is, no buffer structure is built between the display panel substrate and the TFT array substrate. Therefore, when the display panel substrate is hit, the force will directly transmit to the TFT array substrate to damage the thin film transistors in the TFT array substrate.

Therefore, a structure that can protect the thin film transistors in the TFT array substrate is needed.

SUMMARY

This present invention provides an electronic paper device and manufacturing method thereof. An additional resin layer is formed between the display panel substrate and the TFT array substrate. The resin layer acts as a buffer layer to disperse force from the display panel substrate to protect the TFT array substrate.

This present invention provides an electronic paper display device. The electronic paper display device includes a thin film transistor array substrate and a display panel disposed on one side of the thin film transistor array substrate. The thin film transistor array substrate comprises a first substrate, a first metal layer, a dielectric layer, a second metal layer, a channel layer, a pixel electrode layer, a protection layer, a first resin layer and a second resin layer. The first metal layer disposed on the first substrate, wherein the first metal layer includes a plurality of scan lines and a plurality of gate electrodes electrically connected to the scan lines. The dielectric layer disposed on the first substrate and covers the first metal layer. The second metal layer disposed on the dielectric layer, wherein the second metal layer includes a plurality of data lines, a plurality of source electrodes electrically connected to the data lines and a plurality of drain electrodes. The channel layer disposed over the dielectric layer and among the source electrodes, the gate electrodes and the drain electrodes. The protection layer disposed on the second metal layer and the channel layer. The first resin layer disposed on the protection layer. The pixel electrode layer disposed on the first resin layer, wherein the pixel electrode layer includes a plurality of pixel electrodes. The second resin layer disposed on the pixel electrode layer. The display panel includes a second substrate, a transparent electrode layer disposed on the second substrate, and an electronic ink material layer between the transparent electrode layer and the thin film transistor array substrate.

In an embodiment, the data lines and the scan lines divide the first substrate into a plurality of pixels, wherein the pixel electrode layer are located within the pixels respectively.

In an embodiment, the second resin layer is formed over the whole thin film transistor array substrate to cover the scan lines, the data lines and the pixel electrode layer.

In an embodiment, the second resin layer is a matrix structure, and the second resin layer covers the pixel electrode layer and does not cover the scan lines and the data lines.

In an embodiment, the second resin layer has a pattern as a Chinese character 「井」, wherein the second resin layer cover the scan lines and the data lines and does not cover the pixel electrode layer.

In an embodiment, the second resin layer includes a plurality of islands.

In an embodiment, the second resin layer has a thickness from 0.5 um to 10 um.

In an embodiment, the material for forming the second resin layer is a positive photoresist or a negative photoresist.

In an embodiment, the material for forming the second resin layer is an Ethylene-Vinyl Acetate copolymer, EVA.

In an embodiment, the material for forming the second resin layer is a mixed material of resin and an inorganic material.

This present invention also provides a method for forming an electronic paper display device. The method includes sequentially forming a first metal layer, a dielectric layer, a second metal layer, a channel layer, a protection layer, a first resin layer, a pixel electrode layer and a second resin layer on a first substrate to form a thin film transistor array substrate. A transparent electrode layer is formed on a second substrate. An electronic ink material layer between the transparent electrode layer and the thin film transistor array substrate.

In an embodiment, the data lines and the scan lines divide the first substrate into a plurality of pixels, wherein the pixel electrode layer are located within the pixels respectively.

In an embodiment, the second resin layer is formed over the whole thin film transistor array substrate to cover the scan lines, the data lines and the pixel electrode layer.

In an embodiment, the second layer is a matrix structure, and the second layer covers the pixel electrode layer and does not cover the scan lines and the data lines.

In an embodiment, the second resin layer has a pattern as a Chinese character 「井」, wherein the second resin layer cover the scan lines and the data lines and does not cover the pixel electrode layer.

In an embodiment, the second resin layer includes a plurality of islands.

In an embodiment, the second resin layer has a thickness from 0.5 um to 10 um.

In an embodiment, the material for forming the second resin layer is a positive photoresist or a negative photoresist.

In an embodiment, the material for forming the second resin layer is an Ethylene-Vinyl Acetate copolymer, EVA.

In an embodiment, the material for forming the second resin layer is a mixed material of resin and an inorganic material.

Accordingly, an additional second resin layer is formed over the pixel electrode layer. The second resin layer acts as a buffer layer to protect the thin film transistor in the thin film transistor array substrate free from hit damage. For example, when the display panel substrate is hit, the second resin layer can disperse this hit force to reduce the force hit the thin film transistor on the thin film transistor array substrate.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1A:
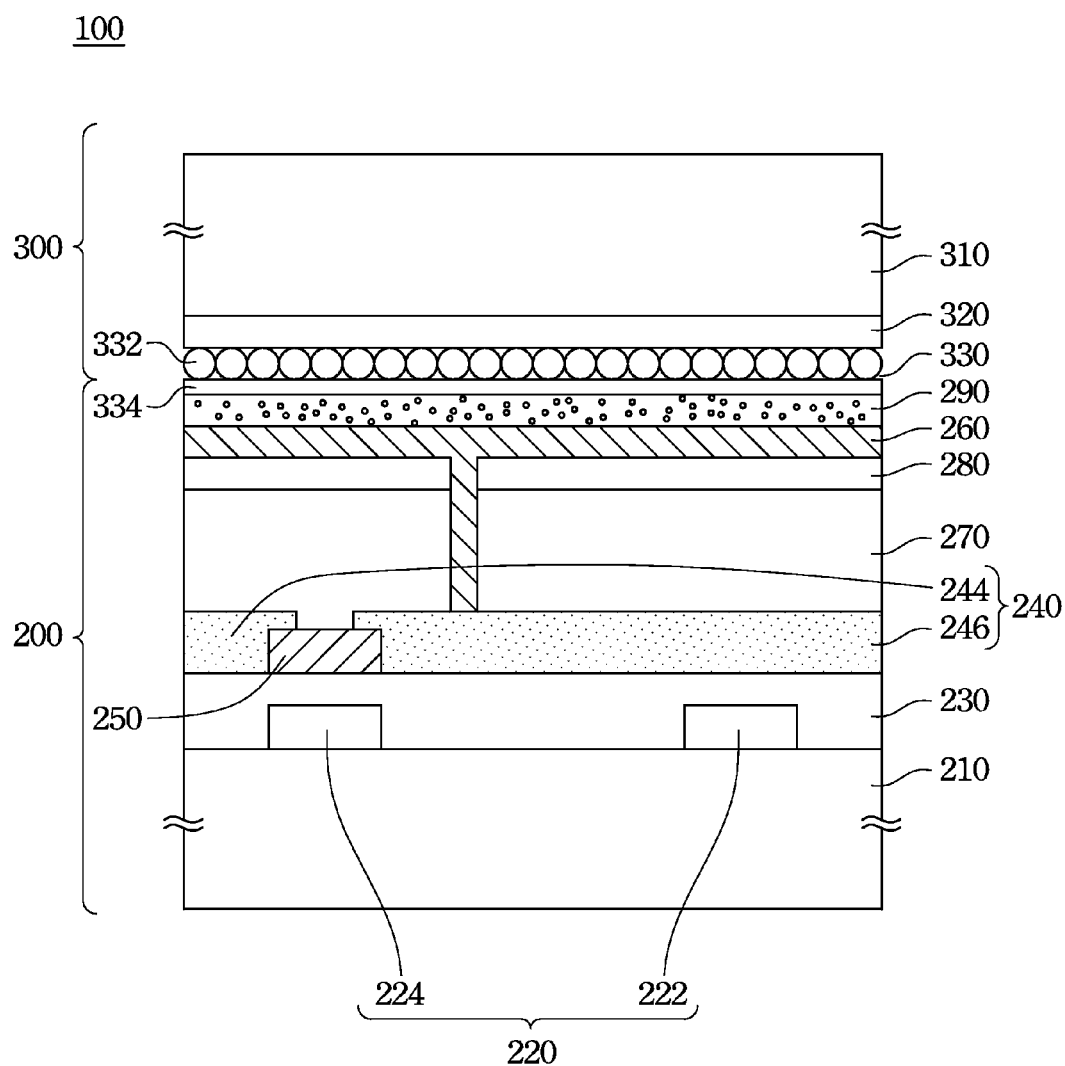
FIG. 1A is a cross-sectional view along line A-A' of FIG. 1B.
Figure 1B:
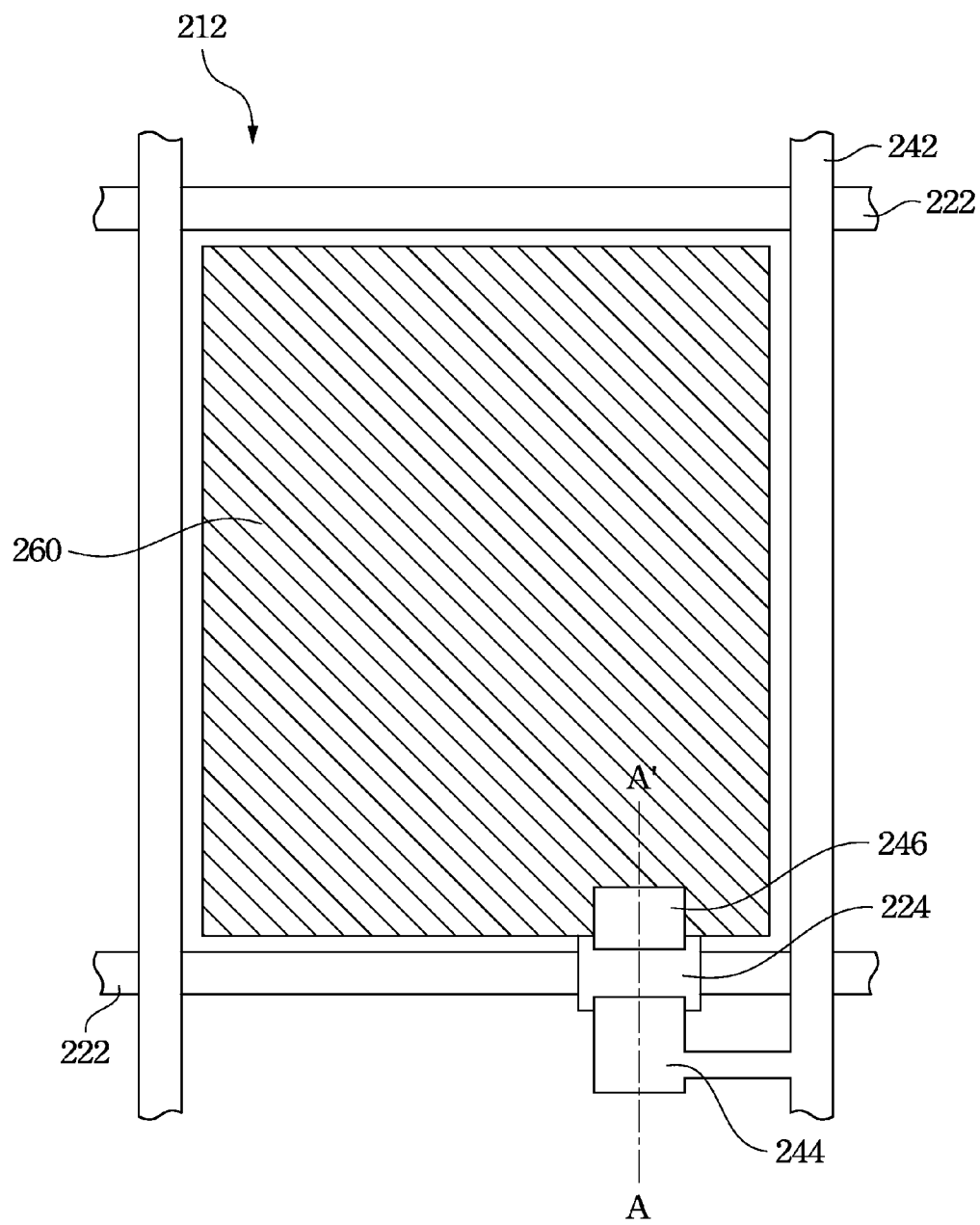
FIG. 1B is a top view of a thin film transistor (TFT) array substrate.

FIG. 1B is a top view of a thin film transistor (TFT) array substrate. FIG. 1A is a cross-sectional view along line A-A' of FIG. 1B. As shown in FIGS. 1A and 1B, the electronic paper display device 100 includes a thin film transistor array substrate 200 and a display panel 300 disposed on one side of the thin film transistor array substrate 200.

The thin film transistor array substrate 200 comprises a first substrate 210, a first metal layer 220, a dielectric layer 230, a second metal layer 240, a channel layer 250, a pixel electrode layer 260, a protection layer 270, a first resin layer 280 and a second resin layer 290.

The first metal layer 220 and the dielectric layer 230 are disposed over the first substrate 210. The dielectric layer 230 covers the first metal layer 220. The first metal layer 220 forms the scan lines 222 and gate electrodes 224 electrically connected to the respective scan lines 222. The second metal layer 240 is disposed on the dielectric layer 230. The second metal layer 240 forms data lines 242 and source electrodes 244 and drain electrodes 246. The protection layer 270 covers the second metal layer 240. The first resin layer 280 covers the protection layer 270. The pixel electrode layer 260 is disposed on the first resin layer 280. A through hole 282 is formed in the first resin layer 280 and the protection layer 270 to expose partial region of the drain electrode 246 in the pixel region 212. The pixel electrode layer 260 is electrically connected to the second metal layer 240 through the through hole 282. The second resin layer 290 is disposed on the pixel electrode layer 260 to act as a buffer layer to protect the thin film transistor in the thin film transistor array substrate free from hit damage. The data lines 242 and the scan lines 222 divide the first substrate 210 into a plurality of pixel areas 212. The gate electrodes 224, the source electrodes 244 and the drain electrodes 246 are disposed inside the respective pixel areas 212. The channel layer 250 is disposed on the dielectric layer 230 between the gate electrode 224, the source electrode 244 and the drain electrode 246. The pixel electrode layer 260 is disposed inside the pixel area 212 and electrically connected to respective drain electrode 246.

The display panel 300 includes a second substrate 310, a transparent electrode layer 320 disposed on the second substrate 310, and an electronic ink material layer 330 between the transparent electrode layer 320 and the thin film transistor array substrate 200. The transparent electrode layer 320 is fabricated using indium tin oxide (ITO), indium zinc oxide (IZO) or other transparent conductive material, for example. The electronic ink material layer 330 has a plurality of mini capsules 332 and each capsule 332 includes black paint, white paint and a transparent fluid, for example. The display panel substrate 300 is adhered to the thin film transistor array substrate 200 through an adhering layer 334. In addition, through changing the electric field direction between the pixel electrode layer 260 and the transparent electrode layer 320, the paint can move up or down according to the direction of the electric field. As a result, the various pixels in the electronic ink display device 400 display a black or a white color. The thickness of the second resin layer 280 is increased to avoid an additional electric field between the second metal layer 240 and the transparent electrode layer 320 being generated to affect the movement of the capsules 332.

FIG. 2 to FIG. 6 illustrate a manufacturing process of a thin film transistor array substrate 200. FIGS. 1A and 1B are also referred.

Figure 2:
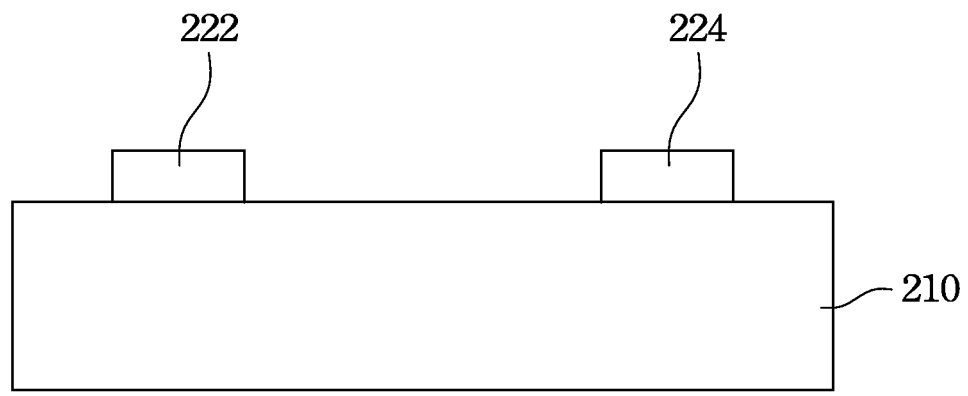
FIG. 2 illustrates a first metal layer formed in a first substrate.

Referring to FIG. 2 first, a first metal layer 220 is formed on a first substrate 100. The material used for the first substrate 210 can be a glass or a transparent insulating plastic. The material used for the first metal layer 220 is chromium (Cr), copper (Cu) or Cu—Cr alloy. Generally, the material used for the first metal layer 220 is formed on the first substrate 210 first. Then, a photolithography process is performed to remove the unnecessary material and define the pattern of the scan lines 222 and gate electrodes 224.

Figure 3:
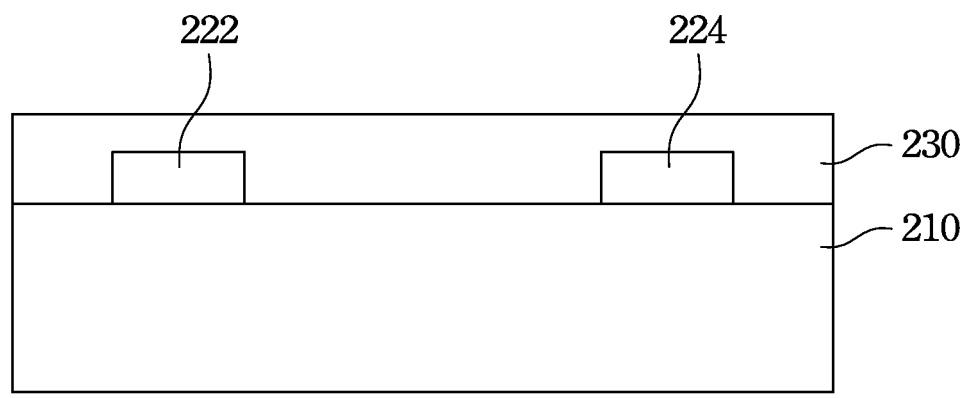
FIG. 3 illustrates a dielectric layer formed over the first metal layer.

Next, referring to FIG. 3, a dielectric layer 230 is formed over the first metal layer 220 to act as an isolation layer. The dielectric layer 230 is formed by plasma enhancement chemical vapor deposition (PECVD). The material of the dielectric layer 230 is a silicon oxide or a silicon nitride (SiNx).

Figure 4:
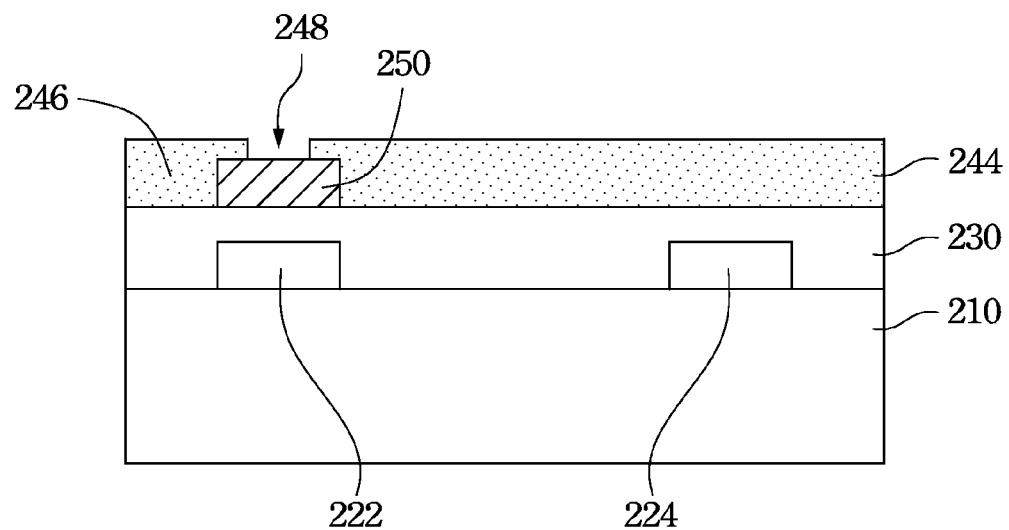
FIG. 4 illustrates a channel layer defined over the dielectric layer and a second metal layer formed over the dielectric layer.

In FIG. 4, a channel layer 250 is formed on a position corresponding to a gate electrode 224 on the dielectric layer 230. Then, an ohmic contact material layer is formed over the channel layer 250. Generally, the channel layer 250 can be formed by using plasma chemical vapor deposition (PECVD). Then, a photolithography process is performed to remove the unnecessary material and define the pattern of the channel layer 250. The channel layer 250 is an amorphous silicon (a-Si) layer. Then, a second metal layer 240 is formed over the dielectric layer 230 and the ohmic contact material layer over the channel layer 250. This second metal layer 240 can be formed by a physical vapor deposition (PVD). Next, a photolithography process and a wet etching process are performed to pattern the second metal layer 240. An opening 248 is formed on the second metal layer 240 to expose the channel layer 250. The second metal layer 240 located on the two sides of the opening 248 is defined as the source electrode 244, the drain electrode 246 and the data line 242 electrically connected to the source electrode 244. The material used for the second metal layer 240 can be chromium (Cr), copper (Cu) or Cu—Cr alloy.

Figure 5:
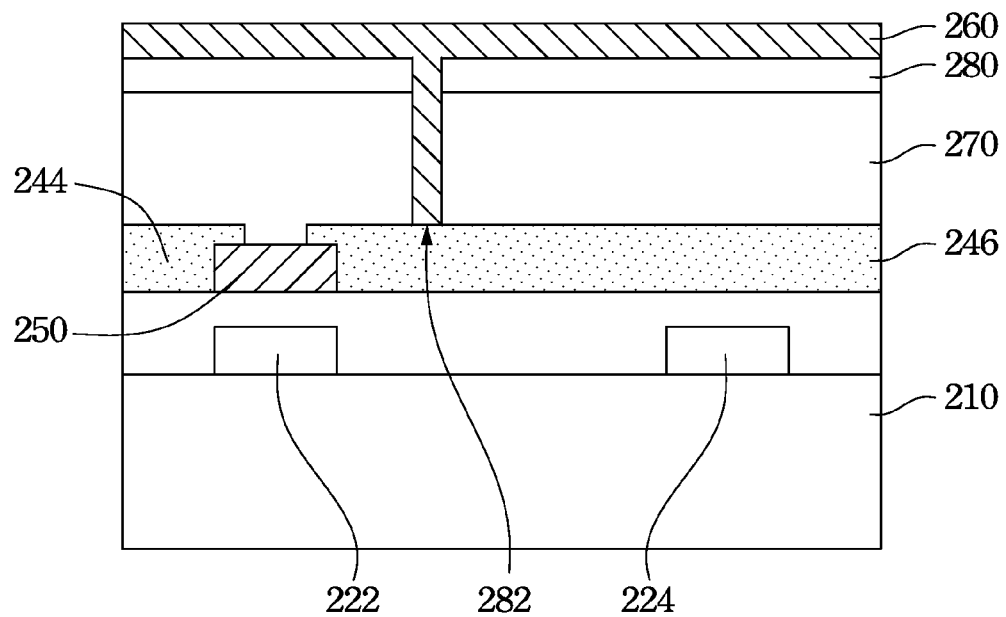
FIG. 5 illustrates to form a protection layer and a first resin layer.

Referring to FIG. 5, a dry etching process is performed while using the defined second metal layer 240 as a mask to remove the partial ohmic contact material layer located on the opening 248. After that, the thin film transistor of the present invention is finished. Next, a protection layer 270, such as a silicon nitride, is formed on the finished structure for preventing moisture from etching the finished structure. Then, a first resin layer 280 is formed over the protection layer 270 to avoid an additional electric field between the second metal layer 240 and the transparent electrode layer 320 being generated to affect the movement of the capsules 332. Next, a photolithography process and an etching process are performed to form a through hole 282 in the protection layer 270 and the first resin layer 280 to expose partial region of the drain electrode 246. A transparent conducting layer is formed on the first resin layer 280 to serve as a pixel electrode layer 260. In a preferred embodiment, an indium tin oxide (ITO) layer is used as the pixel electrode layer 260. The pixel electrode 260 is electrically connected to the drain electrode 246 through the through hole 282.

Figure 6:
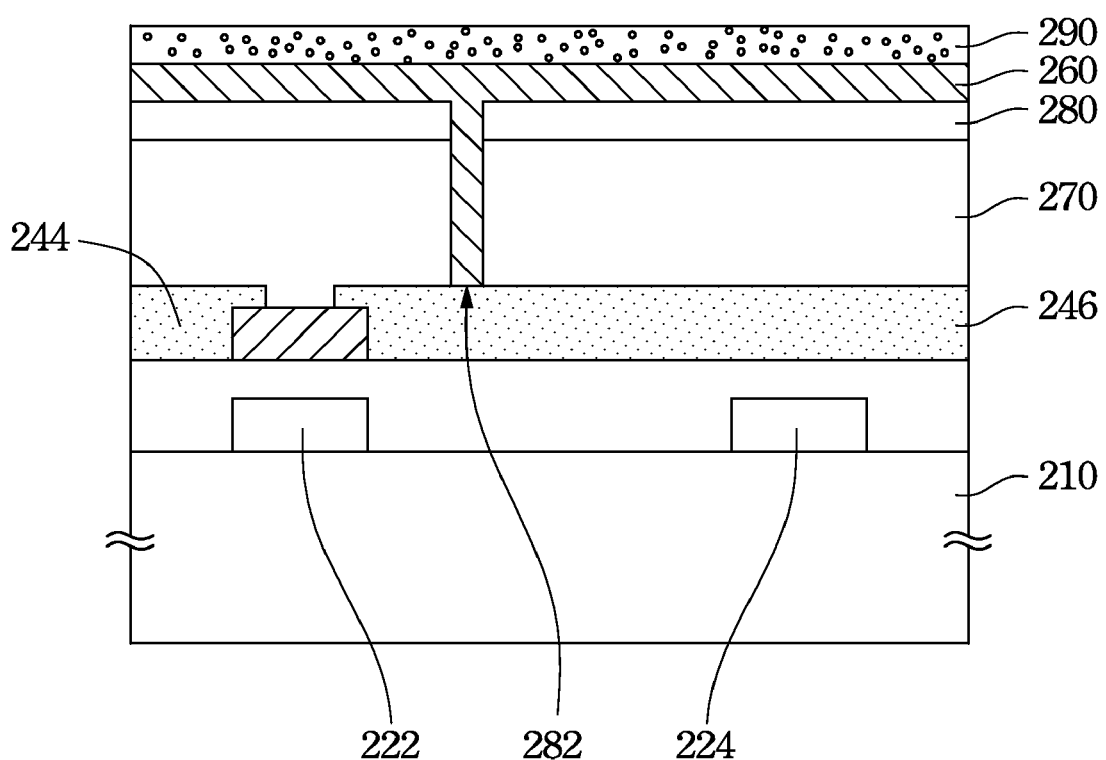
FIG. 6 illustrates a second resin layer formed over the pixel electrode layer.

Finally, referring to FIG. 6, a second resin layer 290 is formed over the pixel electrode layer 260 by a spin coating method. The second resin layer 290 acts as a buffer layer to protect the thin film transistor in the thin film transistor array substrate 200 free from hit damage. For example, when the display panel substrate 300 is hit, the second resin layer 290 can disperse this hit force to reduce the force hit the thin film transistor on the thin film transistor array substrate 200. In an embodiment, the second resin layer 290 has a thickness of 0.5 um to 10 um. Positive photoresist or negative photoresist is used to form the second resin layer 290. In another embodiment, Acrylic resin or a mixed material of resin and Silica gel is used to form the second resin layer 290. In a further embodiment, the Ethylene-Vinyl Acetate copolymer, EVA, is used to form the second resin layer 290. In a further embodiment, a mixed material of resin and an inorganic material, such as Silicon, Silica, Titania or nano material, is used to form the second resin layer 290.

In an embodiment, the second resin layer 290 is formed over the whole thin film transistor substrate 200. That is, no pattern is formed in the second resin layer 290. The scan lines 222, the data lines 242, the pixel electrode layer 260 and the thin film transistors are covered by the second resin layer 290.

Figure 7:
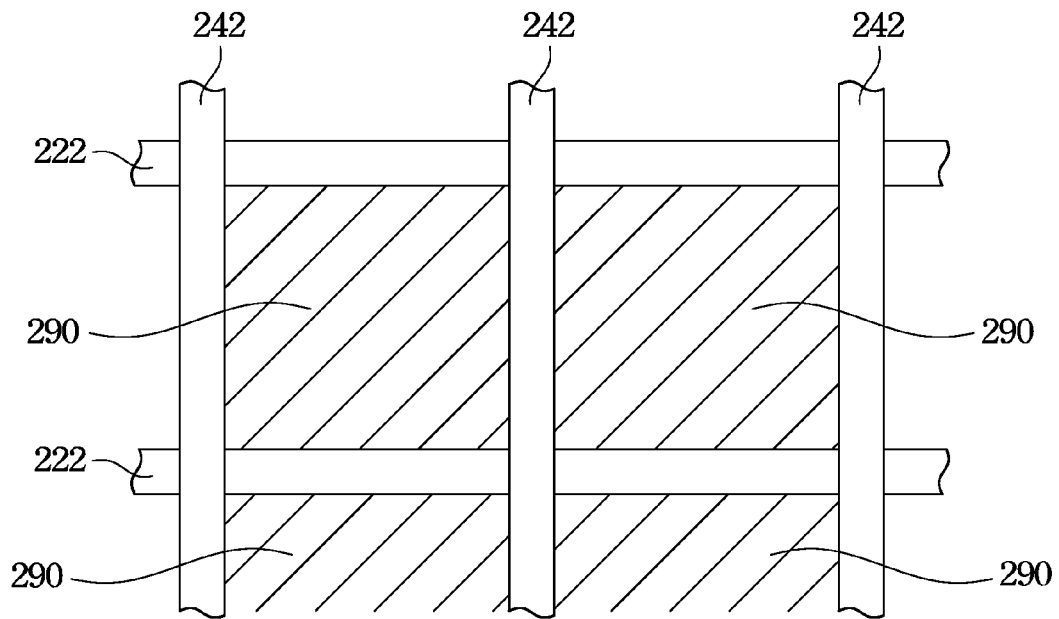
FIG. 7 illustrates a second resin layer with a matrix structure.

In another embodiment, as shown in the FIG. 7, the second resin layer 290 is a matrix structure and does not cover the scan lines 222 and the data lines 242. In other words, in each pixel, the second resin layer 290 is formed over the whole pixel electrode layer 260. Therefore, the thin film transistor and the pixel electrode layer 260 are covered by the second resin layer 290 in each pixel.

Figure 8:
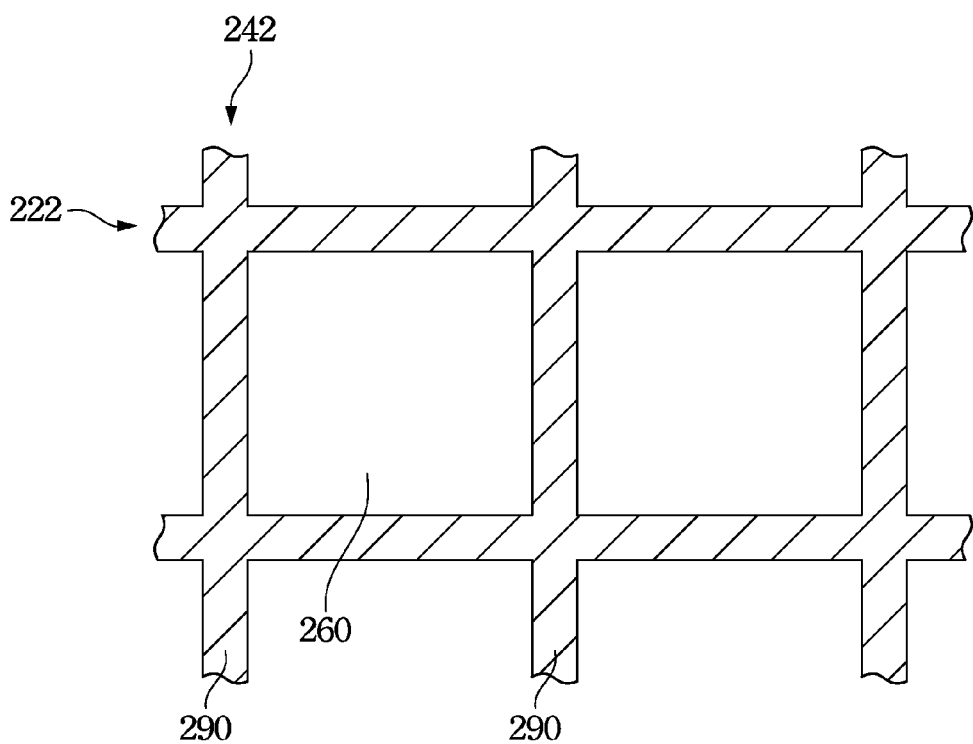
FIG. 8 illustrates a second resin layer with a structure as a Chinese character 「#」.

In a further embodiment, as shown in the FIG. 8, the second resin layer 290 is formed over the scan lines 222 and the data lines 242. That is, the second resin layer 290 has a structure as a Chinese character 「#」. In other words, in each pixel, the second resin layer 290 is formed over the scan lines 222 and the data lines 242. Therefore, the thin film transistor and the pixel electrode layer 260 are not covered by the second resin layer 290 in each pixel. However, it is noticed that the structure of the second resin layer 290 is not limited by the foregoing embodiments. For example, the second resin layer 290 includes many islands. The appearance of islands and the locations of islands formed in the thin film transistor substrate are not limited. Each island can be a square bump, a diamond bump, a circular bump or a polygon bump.

Accordingly, an additional second resin layer is formed over the pixel electrode layer. The second resin layer acts as a buffer layer to protect the thin film transistor in the thin film transistor array substrate free from hit damage. For example, when the display panel substrate is hit, the second resin layer can disperse this hit force to reduce the force hit the thin film transistor on the thin film transistor array substrate.

Although the present invention has been described in considerable detail with reference to certain embodiments thereof, other embodiments are possible. Therefore, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:
   a thin film transistor array substrate, wherein the thin film transistor array substrate comprises:
      a first substrate;
      a first conductive layer disposed on the first substrate;
      a dielectric layer covering the first conductive layer;
      a second conductive layer disposed on the dielectric layer, wherein the dielectric layer is disposed between the first conductive layer and the second conductive layer;
      a first resin layer; and
      a pixel electrode layer, wherein the pixel electrode layer includes a plurality of pixel electrodes; and
   a display panel disposed on one side of the thin film transistor array substrate and comprising a transparent electrode layer, wherein the first resin layer is disposed between the second conductive layer and the transparent electrode layer.

2. The display device of claim 1, wherein the thin film transistor array substrate further comprises a second resin layer disposed on the pixel electrode layer.

3. The display device of claim 2, wherein the first conductive layer includes a plurality of scan lines and a plurality of gate electrodes electrically connected to the scan lines, and the second conductive layer includes a plurality of data lines, a plurality of source electrodes electrically connected to the data lines and a plurality of drain electrodes.

4. The display device of claim 3, wherein the second resin layer is formed over the thin film transistor array substrate to cover the scan lines, the data lines and the pixel electrode layer.

5. The display device of claim 2, wherein the second resin layer includes a plurality of islands.

6. The display device of claim 2, wherein the second resin layer has a thickness from 0.5 um to 10 um.

7. The display device of claim 2, wherein the second resin layer is formed by a positive photoresist or a negative photoresist.

8. The display device of claim 2, wherein the second resin layer is formed by a mixed material of resin and an inorganic material.

9. A display device, comprising:
a thin film transistor array substrate, wherein the thin film transistor array substrate comprises:
 a first substrate;
 a first conductive layer disposed on the first substrate;
 a dielectric layer covering the first conductive layer;
 a second conductive layer disposed on the dielectric layer, wherein the dielectric layer is disposed between the first conductive layer and the second conductive layer;
 a second resin layer; and
 a pixel electrode layer, wherein the pixel electrode layer includes a plurality of pixel electrodes; and
a display panel disposed on one side of the thin film transistor array substrate and comprising a transparent electrode layer, wherein the second resin layer is disposed between the pixel electrode layer and the transparent electrode layer.

10. The display device of claim 9, wherein the thin film transistor array substrate further comprises a first resin layer disposed between the second conductive layer and the pixel electrode layer.

11. The display device of claim 9, wherein the first conductive layer includes a plurality of scan lines and a plurality of gate electrodes electrically connected to the scan lines, and the second conductive layer includes a plurality of data lines, a plurality of source electrodes electrically connected to the data lines and a plurality of drain electrodes.

12. The display device of claim 11, wherein the second resin layer is formed over the thin film transistor array substrate to cover the scan lines, the data lines and the pixel electrode layer.

13. The display device of claim 9, wherein the second resin layer includes a plurality of islands.

14. The electronic paper display device of claim 9, wherein the second resin layer has a thickness from 0.5 um to 10 um.

* * * * *